J. M. MAYHEW.
Chafing Roller for Wagon.
No. 79,995.
Patented July 14, 1868.
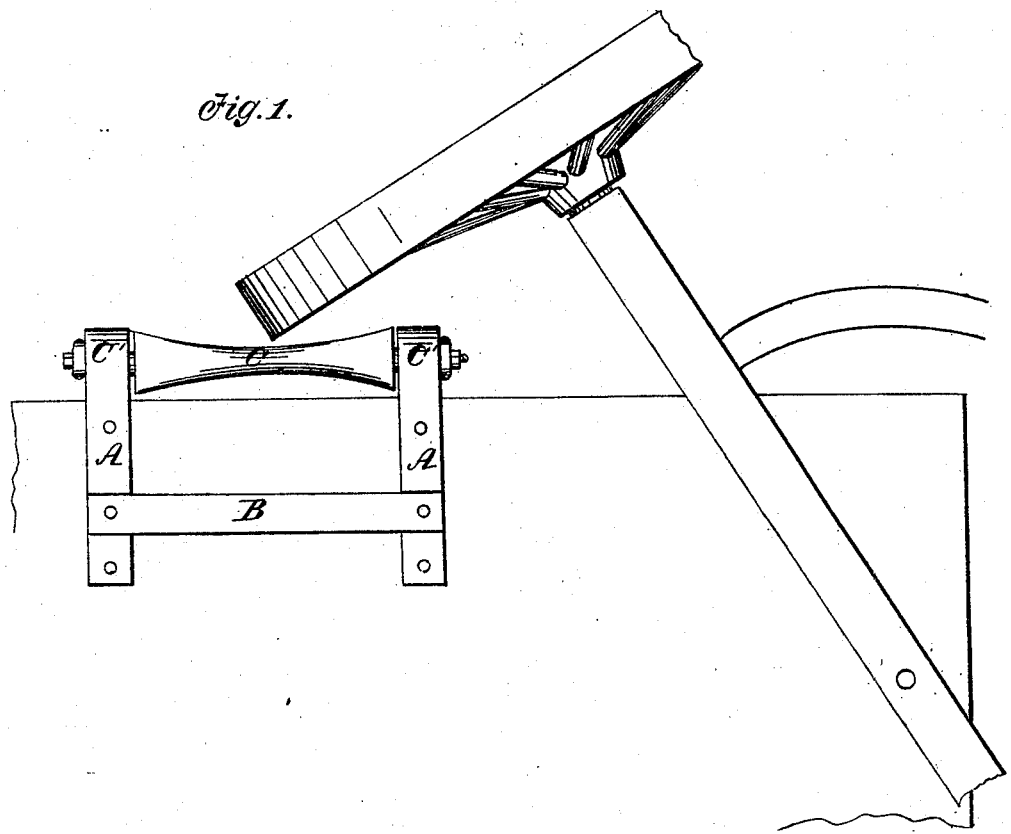
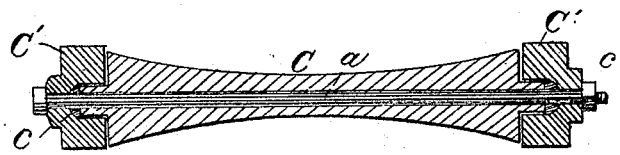
Witnesses.
Inventor:

United States Patent Office.

JAMES M. MAYHEW, OF PROVIDENCE, RHODE ISLAND.

Letters Patent No. 79,995, dated July 14, 1868.

IMPROVEMENT IN CHAFING-ROLLERS FOR WAGONS.

*The Schedule referred to in these Letters Patent and making part of the same.*

TO ALL WHOM IT MAY CONCERN:

Be it known that I, JAMES M. MAYHEW, of Providence, in the county of Providence, and State of Rhode Island, have invented a new and improved Chafing-Roller for Wagons; and I do hereby declare that the following is a full, clear, and exact description thereof, which will enable those skilled in the art to make and use the same, reference being had to the accompanying drawings, forming part of this specification, in which—

Figure 1 represents my improved chafing-roller as applied to a wagon to protect the side from wear by rubbing of the front wheel when turned.

Figure 2 is a central longitudinal section of my improved chafing-roller for wagons.

Similar letters of reference indicate corresponding parts.

This invention relates to a new and useful device for protecting the sides of wagons or other vehicles from chafing or wearing when the front wheels are turned, and it consists in a hollow concave iron roller, secured to a holding-frame, as hereinafter described.

A A are two metal side-pieces of a holding-frame, connected by a cross-bar, B, that is fastened by screws or rivets.

C is a concave metal roller, the ends of which are fitted in recesses in the ends C' of the side-pieces A A.

The roller C is hollow, and a bolt or rod, $a$, passes through it and secures it to the side-pieces A A, by a screw and nut on the end.

At the bottom of the recess in the side-pieces A A, are placed rubber cushions $c\ c$, to bear against the ends of the roller C, for the purpose of preventing it from working loose and rattling by the motion of the wagon.

The holding-frame A A is fastened to the sides of a wagon-body, so that the front wheels will rub against the roller C when either of them shall turn, in order to protect the wagon from injury, and the roller will turn by the bearing of the tire of the wheel, without locking fast or wearing either the tire or the sides of the wagon.

Having described my invention, I claim as new, and desire to secure by Letters Patent—

The construction of the concave chafing-roller C upon the longitudinal rod $a$, having its bearings in the ends C' of the side-pieces A, which are recessed to receive the elastic cushions $c\ c$, bearing against the ends of said roller, all operating as described for the purpose specified.

JAMES M. MAYHEW.

Witnesses:
A. P. BRYANT,
T. F. NEVILLE.